United States Patent [19]
Kraft et al.

[11] Patent Number: 5,614,702
[45] Date of Patent: Mar. 25, 1997

[54] KEYBOARD ACTUATOR WITH CATCH HOOKS AND WEAKENED PORTION

[75] Inventors: Horst Kraft, Balingen; Gerhard Dekorsy, Radolfzell, both of Germany

[73] Assignee: Bizerba-Werke Wilhelm Kraut GmbH & Co. KG, Balingen, Germany

[21] Appl. No.: 193,190

[22] PCT Filed: Aug. 22, 1992

[86] PCT No.: PCT/EP92/01931

§ 371 Date: Feb. 14, 1994

§ 102(e) Date: Feb. 14, 1994

[87] PCT Pub. No.: WO93/05373

PCT Pub. Date: Mar. 18, 1993

[30] Foreign Application Priority Data

Sep. 3, 1991 [DE] Germany .................. 41 29 234.0

[51] Int. Cl.⁶ .................................................. G06C 7/02
[52] U.S. Cl. .................................... 235/145 R; 200/5 A
[58] Field of Search .............................. 235/145 R, 146, 235/145 A; 200/5 A, 6 A, 16 A, 17 R, 18

[56] References Cited

U.S. PATENT DOCUMENTS

| | | | |
|---|---|---|---|
| 4,620,075 | 6/1985 | La Belle et al. | 200/159 B |
| 4,710,597 | 12/1987 | Loheac | 200/5 A |
| 5,021,638 | 6/1991 | Nopper et al. | 235/145 R |

FOREIGN PATENT DOCUMENTS

| | | |
|---|---|---|
| 2704886 | 8/1978 | Germany . |
| 3345372 | 6/1985 | Germany . |
| 8700968 | 1/1987 | Germany . |
| 3915645 | 11/1990 | Germany . |

Primary Examiner—Cassandra C. Spyrou
Attorney, Agent, or Firm—Shenier & O'Connor

[57] ABSTRACT

A keyboard for a fully electronic, microcomputer-controlled commercial scale with call-up memory, in particular for self-service or quick-service purposes, comprises a keyboard consisting of a plurality of individual keys with actuating elements, whereby symbols and/or alphanumerical characters are assigned to the individual keys. The keyboard has a guide plate with a plurality of individual keys arranged at a certain grid distance from each other. The guide plate is provided over its entire surface with actuating elements for the individual keys.

7 Claims, 4 Drawing Sheets

KEYBOARD ACTUATOR WITH CATCH HOOKS AND WEAKENED PORTION

The invention relates to a keyboard for a fully electronic, microcomputer-controlled commercial scale with call-up memory, in particular for self-service or quick-service purposes, having a keyboard consisting of a plurality of individual keys with actuating elements, whereby symbols and/or alphanumerical characters are assigned to the individual keys, the keyboard comprising a guide plate with a plurality of individual keys arranged at a certain grid distance from each other and having switching contact elements, and whereby the guide plate is provided over its entire surface with actuating elements for the individual keys.

By means of such a keyboard which is, for example, known from DE-A-3 345 372, the stored basic price (price per unit of weight) of a certain product is called up from a memory which is then multiplied by the weight determined by the scale, whereupon the scale calculates and displays the sales price of the product placed on the scale.

Depending on whether such a commercial scale is used more for self-service ("S-S") or quick-service ("Q-S") purposes, the individual keys of the keyboard are normally provided with pictograms (symbols) or alphanumerical designations, whereby generally in S-S scales, individual keys with larger pictograms are used and in Q-S scales, smaller, alphanumerically labelled individual keys are used in greater numbers. This is mainly due to the fact that the range of goods offered in the environment of a S-S scale is, as a rule, smaller than the range of goods offered in connection with a Q-S scale and trained sales personnel.

Depending on the purpose of use of the commercial scale and the range of goods offered, an interchangeable product designation on the keyboard is desired. Such an interchangeable designation is described, for example, in DE-A1-3 345 372. Furthermore, it is known (DE-A1-3 802 660) to design the size and the type of the key descriptions as a function of S-S or Q-S operation. Moreover, a special type of keyboard is known (DE-A1-3 915 645) in which, however, it is disadvantageous that the key switches (switching contact elements), in general, are not optimally arranged with respect to the possible actuation point of a key-covering film placed over it or that the keyboard is constructed as a touch sensitive keyboard without perceptible snap effect and normally without overload protection.

A general disadvantage of the solutions used today is in the fact that the keyboard is designed, with reference to the size of the pictograms, only for a single size or that the pictograms are not interchangeable in a simple manner.

The object of the invention is to design a keyboard of the generic type such that product designations in the form of pictograms and/or lettering can be quickly and easily changed according to type and size and so they can be adapted to the respective range of products offered and designed so as to be reliable with respect to operational as well as overload safety, whereby it also ought to be possible, in particular, to highlight special offers by oversized, optimally-placed key areas and to operate the keys jointly in this area.

The object is accomplished in accordance with the invention by the characterizing features of patent claim 1.

In preferred embodiments of the invention, the guide plate is surrounded by an outer frame. The guide plate can be provided with actuating elements variable in size for the individual keys.

The following description of a preferred embodiment of the invention serves to explain the invention in greater detail in conjunction with the attached drawings. In the drawings.

Figure 1:
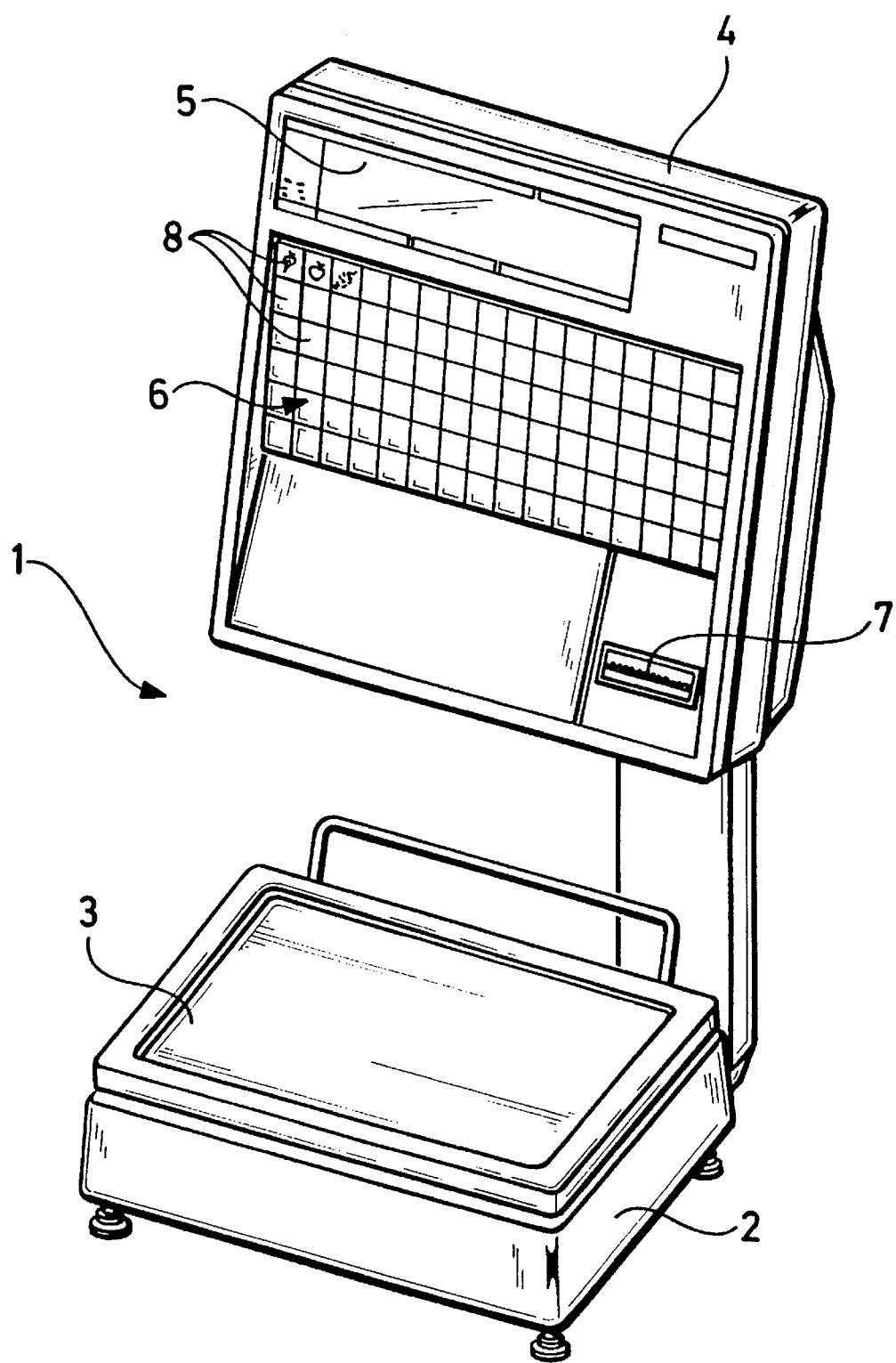
FIG. 1 shows schematically, a graphic view of a self-service commercial scale with integrated keyboard.

The self-service commercial scale 1 represented in FIG. 1 essentially comprises a weighing plate 3 arranged on a scale base 2 for receiving a product to be weighed as well as an upright display and operating portion 4 with display field 5, keyboard 6 and printer, the latter only being represented by a slit 7 for issuing a label with the usual sales data, as for example, basic price, weight, total price, etc. The keyboard 6 stationarily mounted on the front side of the display and operating portion 4 is provided with numerous, for example, 96 individual keys 8. The individual keys 8 are provided with product designations (so-called pictograms [symbols] and/or lettering), whereby the keys 8 are designed in the known manner as so-called mini-lift keys with snap effect.

Figure 2:
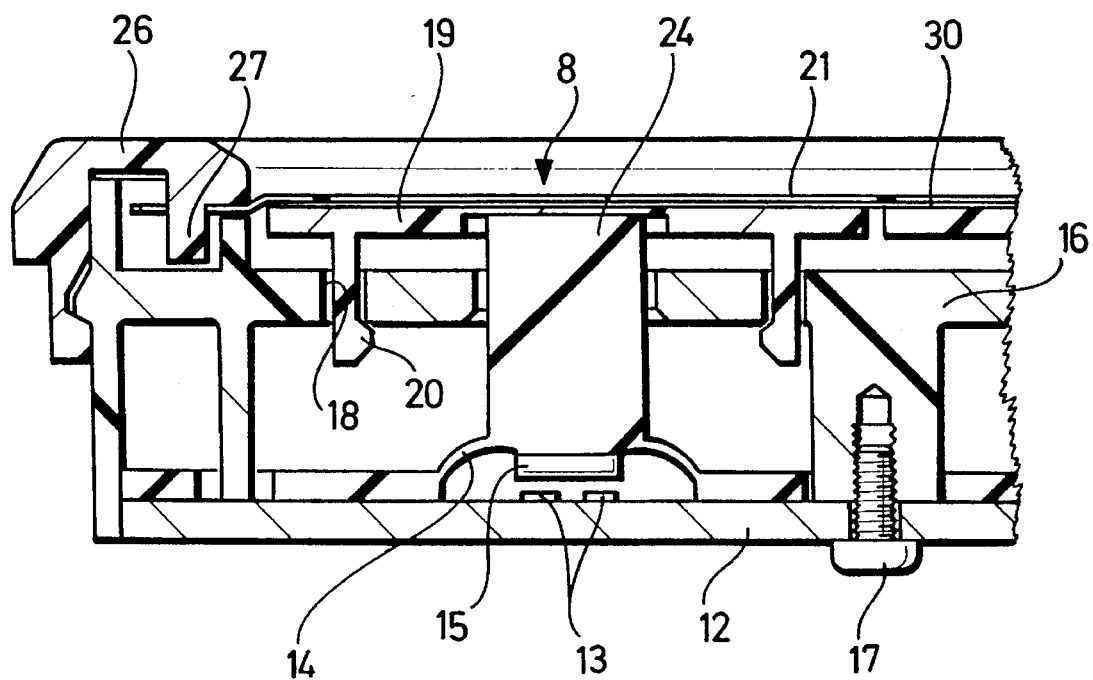
FIG. 2 shows a sectional view of part of the keyboard from FIG. 1.

FIG. 2 shows in section, essentially an individual key 8 of the keyboard 6 with the switching contact elements assigned to this key. The keyboard 6 comprises a printed circuit board 12 with conductor paths 13. An elastic contact mat or pad 14 is arranged above the printed circuit board 12 and each mat has a contact element 15 made of electrically conductive material at its underside in an area arched upwards. A guide plate 16 is provided at a certain distance above the contact mat 14. Guide plate 16, contact mat 14 and printed circuit board 12 are connected with each other by means of screws 17. Actuating elements 19 which are vertically displaceable in fixing openings 18 are guided in the printed circuit board 16 and at the same time, are easily detachably and interchangeably locked by means of catch hooks provided thereon.

Figure 3:
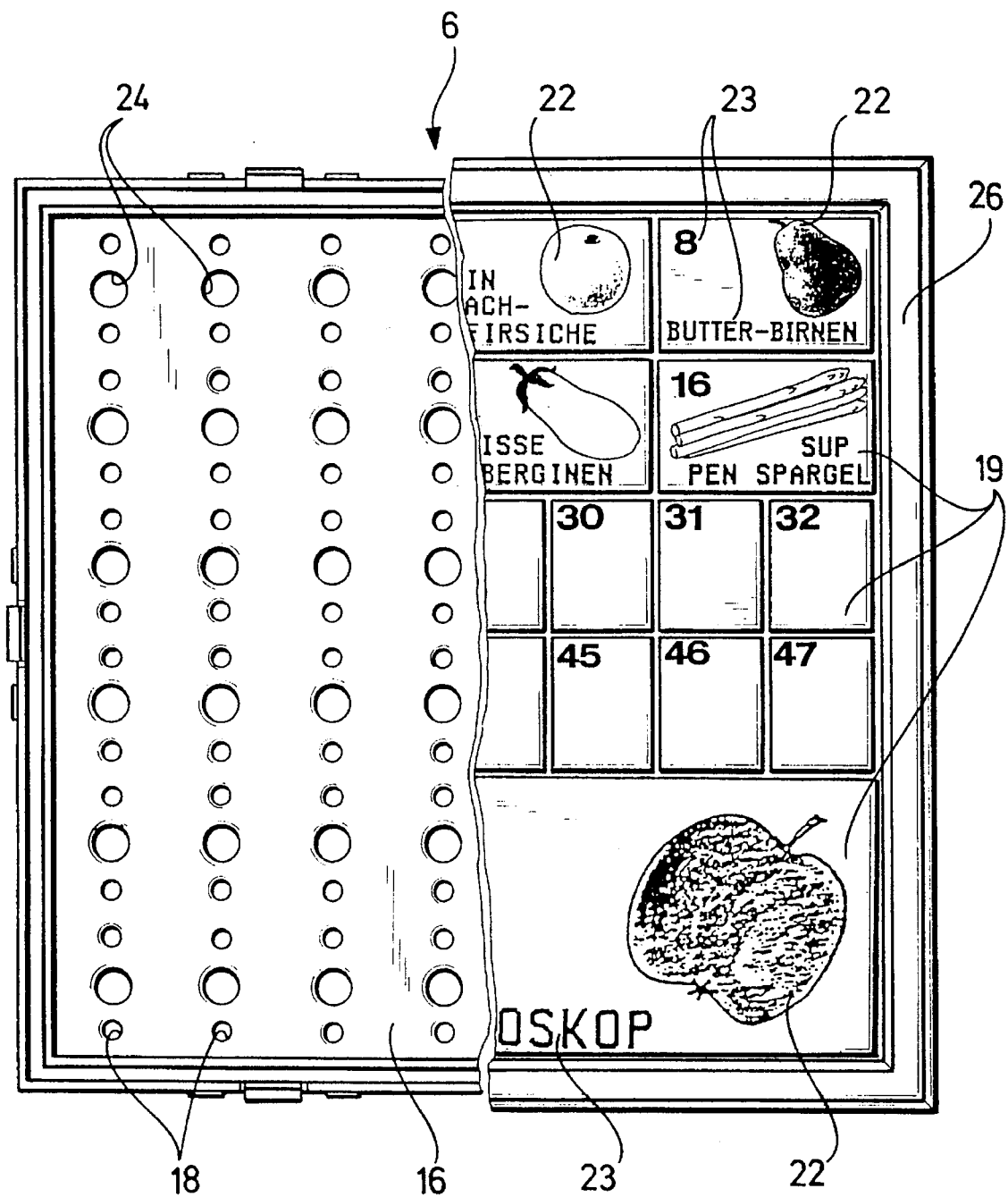
FIG. 3 shows a cut-away plan view of the keyboard from FIGS. 1 and 2 with individual actuating elements bearing product designations and FIGS. 4a–4b show an actuating element with hinge-like weakenings.

The essentially rigid actuating elements 19 bear stuck-on sheets or films 30 with product symbols 22 or alphanumerical product designations 23 (FIGS. 3 and 4). When actuating an element 19 with the finger, this presses down the upwardly-arched area of the contact mat 14 via a press element 24 formed at this mat. Hereby, the contact element 15 produces an electrically conductive connection on the printed circuit board 12 between the conductor paths 13. The contact mat 14 is developed such that a snap effect and a defined restoring force result. At the same time, the contact mat 14 serves as protection against dust and dampness.

Furthermore, the press element 24 is designed in its length and in its rigidity such that when a certain operating force is exceded, the actuating element 19 comes to rest on the guide plate 16 and, thus, protects the contact point 13, 15 from overload.

The actuating elements 19 are covered in the area of the entire keyboard at the top side by a continuous protective sheet 21 which is clamped down by an outer frame 26 and fixed by means of pins 27.

In the embodiment represented, the sheets or foils 30 with the product symbols 22 or characters 23 are stuck onto the actuating elements 19. In another embodiment of the invention, the product symbols 22 or characters 23 are fixed to a continuous, intermediate inscription sheet not illustrated, instead of to the sheet 30. In a further variation, the protective sheet 21 itself is provided accordingly with symbols 22 or alphanumerical characters 23. The sheet 30 could likewise be of a continuous design.

FIG. 3 shows the keyboard 6 partially in a plan view, whereby the left section of the keyboard is represented without protective sheet 21, frame 26 and actuating elements 19. In this part, the guide plate 16 with the press elements 24 of the contact mat 14 is visible including the fixing openings 18 over its entire surface for receiving the catch hooks 20 of the actuating elements 19.

In the right section of FIG. 3, the keyboard is represented as complete. In this section, essentially rigid actuating elements 19 of various sizes with symbols 22 or designations 23 are present which optionally cover and actuate one or several individual keys 8. In particular, the actuating element 19 represented in FIG. 3, bottom right, covers and actuates more than two, for example, eight individual keys 8, so that a large product character can be optimally attached to this element in a particularly emphasized manner.

Figure 4A:
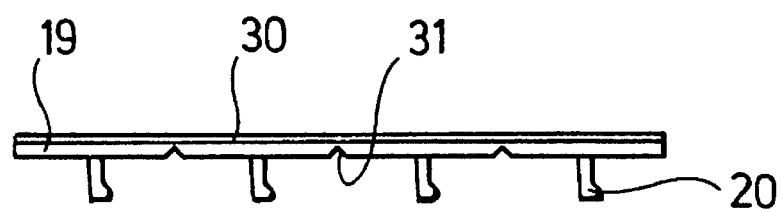
Figure 4B:
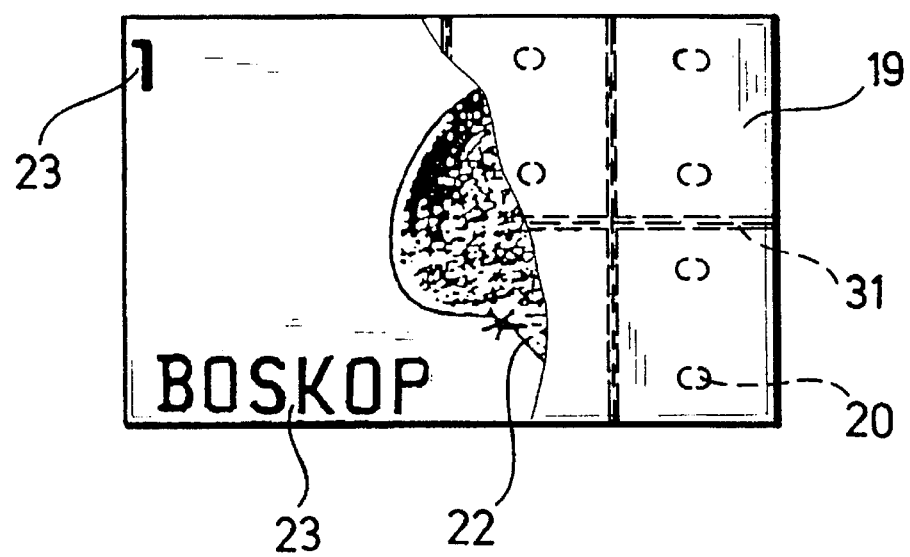

FIGS. 4a and 4b show an actuating element 19 with hinge-like weakenings, 31, which again covers several individual keys 8 and to which, for example, a suitably larger film 30 is stuck.

The weakenings 31 serve the purpose of making the actuating element 19 flexible and of thereby concentrating the required actuating force in such a manner that during actuation, not all individual keys 8 lying under the actuating element 19 need to be pressed simultaneously, but only the individual key 8 lying directly under or those keys located in the immediate vicinity of the pressing finger.

We claim:

1. A keyboard including in combination an array comprising a plurality of spaced depressable elements including two adjacent depressable elements, a guide plate having a plurality of openings, each one of said openings being disposed in proximity to a corresponding one of said depressable elements, means comprising a plurality of actuators for depressing said depressable elements, each of said actuators having a catch hook inserted in a corresponding one of said openings, one of said actuators being capable of depressing said two adjacent depressable elements, said one actuator being provided with a weakened portion between said two adjacent depressable elements, said weakened portion functioning as a hinge.

2. A keyboard as in claim 1 wherein said plate is provided with an additional opening disposed in proximity to one of said depressable elements and wherein the actuator for said one depressable element is provided with an additional catch hook which is inserted in said additional opening.

3. A keyboard as in claim 1 further including a generally planar continuous transparent protective sheet covering said actuators.

4. A keyboard as in claim 1 wherein said plate has an upper surface and said actuators are separated from said surface but come to bear against said surface when the force exerted by one of said actuators on one of said depressable elements exceeds a predetermined value.

5. A keyboard as in claim 1 wherein the array comprises a plurality of rows and columns and wherein said one actuator is capable of depressing two adjacent elements in the same row.

6. A keyboard as in claim 1 wherein the array comprises a plurality of rows and columns and wherein said one actuator is capable of depressing two adjacent elements in the same column.

7. A keyboard as in claim 1 wherein the array comprises a plurality of rows and columns and wherein said one actuator is capable of depressing two adjacent elements in the same row and two adjacent elements in the same column.

* * * * *